United States Patent Office 3,344,026
Patented Sept. 26, 1967

3,344,026
DOSAGE UNIT COMPOSITION OF 1-(p-CHLORO-PHENYL)-1,2-CYCLOPROPANEDICARBOXIMIDE FOR RELIEF OF DEPRESSION
Eugene N. Greenblatt, Spring Valley, N.Y., and Sidney R. Safir, River Edge, N.J., assignors to American Cyanamid Company, Stamford, Conn., a corporation of Maine
No Drawing. Filed May 16, 1966, Ser. No. 550,175
2 Claims. (Cl. 167—65)

ABSTRACT OF THE DISCLOSURE

This invention describes a method of relieving depression in warm-blooded animals by the administration of compositions containing as the active component 1-(p-chlorophenyl)-1,2-cyclopropanedicarboximide. The latter compound is unusual in that in warm-blooded animals, it acts as a (CNS) anti-depressant or stimulant.

In U.S. Patent 3,166,571, novel cyclopropane - dicarboximides are described which exhibit activity as central nervous system depressants useful as tranquilizing agents, hypnotic agents or muscle relaxants. We have now found that 1 - (p-chlorophenyl)-1,2-cyclopropanedicarboximide, a compound described in U. S. Patent 3,166,571, is surprisingly unique in that, in addition to the expected central nervous system depressant activity, it has stimulant and antidepressant activity as well. This combination of depressant and stimulant-antidepressant activity indicates a wide range of therapeutic utility in mental disorders of various types, for example, in the management of depressive states, in the treatment of convulsive disorders such as epilepsy, and in the alleviation of anxieties.

The compositions of the present invention containing as the active ingredient 1-(p-chlorophenyl)-1,2-cyclopropanedicarboximide have been found useful when the active component is present in from 1 to 100 milligrams per kilogram of body weight per day of warm-blooded animals and by the route selected to administer the drug. Parenteral administration generally requires smaller doses than oral administration.

One of the criteria for assessing depressant activity is the impairment of the ability of warm-blooded test animals, e.g., mice, to traverse a horizontally mounted steel rod. Untreated mice will, when placed on such a rod, rapidly traverse the rod from one end to the other. Fifty percent of the mice treated with 1-(p-chlorophenyl)-1,2-cyclopropanedicarboximide at a dose of 150 milligrams per kilogram, intraperitoneally, are not able to perform this act. Sodium phenobarbital, a well known central nervous system depressant, similarly affects the rod walking ability of mice at a dose of 43 milligrams per kilogram intraperitoneally.

Another test which has been used to demonstrate depressant activity measures the impairment of the ability of test animals, e.g., mice, to remain on a wire mesh screen inclined at an angle of 60°. Untreated mice will customarily cling to the screen indefinitely. Fifty percent of the mice treated with 1-(p-chlorophenyl)-1,2-cyclopropanedicarboximide at a dose of 334 milligrams per kilogram intraperitoneally, lose their ability to remain on the screen during a thirty minute period and fall off. Sodium phenobarbital, a reference depressant agent, causes a corresponding effect in mice at 90 milligrams per kilogram intraperitoneally.

A third test for measurement of depressant activity is the determination of the dose whereby 50 percent of the warm-blooded animals, e.g., mice, lose the righting reflex ($LR_{50}$). Righting reflex is defined as the ability of warm-blooded animals, e.g., mice, to right themselves after being placed on their backs or sides. Untreated mice will perform this act immediately after being so placed. The $LR_{50}$ for 1-(-p-chlorophenyl)-1,2-cyclopropanedicarboximide is 670 milligrams per kilogram intraperitoneally. Sodium phenobarbital, a reference depressant agent, shows an $LR_{50}$ in mice at 138 milligrams per kilogram intraperitoneally.

A further test useful for demonstration of depressant activity is the prolongation of the duration of sleeping time in warm-blooded animals, e.g., mice, caused by reference depressant such as sodium pentobarbital, ethanol and meprobamate. 1-(p-chlorophenyl)-1,2-cyclopropanedicarboximide, at a dosage of 150 milligrams per kilogram intraperitoneally, causes a three- to four-fold increase in the duration of sleeping time caused by each of the above-mentioned reference agents.

Another measure of depressant activity is the ability to prevent convulsive seizures in warm-blooded animals, e.g., mice, caused by strychnine sulfate, pentylenetetrazol, or by electroshock. The dose of 1-(p-chlorophenyl)-1,2-cyclopropanedicarboximide which protects 50 percent of the mice from convulsive seizures caused by strychnine sulfate is 16 milligrams per kilogram intraperitoneally. A dose of 50 milligrams per kilogram, orally, protected 100% of the mice from the convulsive seizures caused by strychnine sulfate. The corresponding dose for protection from convulsive seizures caused by pentylenetetrazol is 86 milligrams per kilogram intraperitoneally; and the dose which protects 50 percent of the mice from convulsive seizures caused by maximal electroshock is 65 milligrams per kilogram intraperitoneally.

In addition to all of the above-mentioned procedures which demonstrate the depressant activity of 1-(p-chlorophenyl)-1,2-cyclopropanedicarboximide, the following procedures have been found to be useful in demonstrating antidepressant or excitatory activity for this compound: (1) inhibition of depression of exploratory behavior (in mice) induced by 2-oxo-3-isobutyl-9,10-dimethoxy-1,2,3,4,6,7 - hexahydro - 11bH-benzo[a]quinolizine (tetrabenazine); (2) increase in spontaneous locomotor activity (in mice); (3) enhancement of the excitatory actions of tranylcypromine and DL-dihydroxyphenylalanine (in mice); (4) enhancement of the lethal action of d-amphetamine in grouped animals (mice); and (5) delayed excitant effects on overt behavior in warm-blooded animals (monkeys and rats).

(1) Untreated mice, when placed in the center of a horizontal disc, will walk rapidly to the edge of the disc and peer over the edge. A reference agent, such as 2-oxo-3 - isobutyl - 9,10 - dimethoxy-1,2,3,4,6,7-hexahydro-11bH-benzo[a]quinolizine (tetrabenazine) will completely suppress this exploratory behavior. However, exploratory behavior is restored to mice which have been treated with 1-(p-chlorophenyl)-1,2-cyclopropanedicarboximide at 150 milligrams per kilogram intraperitoneally prior to treatment with 2-oxo-3-isobutyl-9,10-dimethoxy-1,2,3,4,6,7-hexahydro-11bH-bromo[a]quinolizine. A reference antidepressant agent, imipramine, 5-(2-dimethylaminopropyl)-10,11 - dihydro - 5H-dibenz[b,f]azepine hydrochloride, also restores the exploratory behavior of tetrabenazine-treated mice.

(2) The spontaneous locomotor activity of warm-blooded animals such as mice, is customarily measured by means of a photoelectric activity counter. Treatment of mice with 1-(p-chlorophenyl)-1,2-cyclopropanedicarboximide at doses of 75 to 300 milligrams per kilogram intraperitoneally causes an increase in the spontaneous motor activity of 34–50%. A well known stimulant reference agent, D-amphetamine, 1-phenyl-2-aminopropane, also causes an increase in locomotor activity at doses of 2.5–20 milligrams per kilogram intraperitoneally.

(3) Treatment of warm-blooded animals, for example, mice, with a combination of tranylcypromine (TCP), a reference monoamine oxidase inhibitor, and DL-di-hydroxyphenylalanine (DOPA) causes approximately a 50% increase in the locomotor activity in comparison to untreated mice. When mice are treated with 20–40 milligrams per kilogram orally or intraperitoneally of 1-(p-chlorophenyl)-1,2-cyclopropanedicarboximide, in addition to TCP and DOPA, an enhancement of the excitatory action, as evidenced by a further increase in the locomotor activity, is observed. Significantly, treatment of mice with doses of 20–40 milligrams per kilogram of 1-(p-chlorophenyl)-1,2-cyclopropanedicarboximide alone produces no effect on locomotor activity. Imipramine, a reference antidepressant agent, also shows the ability to enhance the excitatory actions of TCP plus DOPA.

(4) The excitement caused by the reference agent, D-amphetamine, is thought to be responsible for the increased mortality observed when mice are housed in groups instead of in solitary confinement. 1-(p-chlorophenyl)-1,2-cyclopropanedicarboximide, at a non-lethal dose of 150 milligrams per kilogram intraperitonally, shows the ability to increase the lethality of D-amphetamine-treated, grouped mice over that which is observed when D-amphetamine is the sole agent administered. The dose which is lethal for 50% of the grouped mice treated with D-amphetamine alone is 21 milligrams per kilogram intraperitoneally. When mice are treated with 150 milligrams per kilogram intraperitoneally of 1-(p-chlorophenyl)-1,2-cyclopropanedicarboximide in combination with D-amphetamine, the 50% lethal dose ($LD_{50}$) of the latter is reduced to 9 milligrams per kilograms intraperitoneally.

(5) Warm-blooded animals such as monkeys which receive 50 milligrams per kilogram intraperitoneally of 1-(p-chlorophenyl)-1,2-cyclopropanedicarboximide remain free of symptoms for almost 24 hours, whereupon a hyperactivity develops which lasts 4 to 5 days. Monkeys which receive 100 milligrams per kilogram intraperitoneally of this agent show an initial mild depression (consisting of a hind leg ataxia) which lasts about 10 hours. Twenty-four hours after dosing, these latter animals develop a hyperactivity which lasts from 4 to 5 days.

Rats recovering from the depressant effects of high doses (500 to 1000 milligrams per kilogram intraperitoneally) of 1-(p-chlorophenyl)-1,2-cyclopropanedicarboximide also show periods of hyperactivity lasting for several hours.

The examples which follow describe the preparation of active components of the present invention and formulations of representative pharmaceutical types.

EXAMPLE I

*Preparation of 1-(p-chlorophenyl)-1,2-cyclopropanedicarboximide*

In a 250 ml. flask fitted with a reflux condenser and a Nichrome wire stirrer are placed 5 g. (0.025 mole) of ethyl p-chlorophenylacetate, 5.7 g. (0.027 mole) of N-bromosuccinimide, 0.1 g. of benzoyl peroxide and 125 ml. of carbon tetrachloride. The reaction mixture is refluxed for 24 hours, cooled and filtered to remove the insoluble succinimide. Concentration of the carbon tetrachloride solution under reduced pressure gives a red oil. Vacuum distillation through a 4-inch Vigreux column gives 5.4 g. (79%) of ethyl α-bromo-p-chlorophenylacetate as a yellow oil, boiling point 107–113° C./.5–.55 mm. In a 3-necked 1-liter flask fitted with a thermometer, a stirrer a gas inlet tube, a reflux condenser and an addition funnel is placed 250 ml. of anhydrous ether. The system is flushed with dry nitrogen and to the ether is added 2.2 g. of a 54.7% sodium hydride-mineral oil dispersion [1.2 g. (0.05 mole) of sodium hydride]. While stirring and passing nitrogen through the system, a mixture of 13.9 g. (0.05 mole) of ethyl α-bromo-p-chlorophenylacetate, 5 g. (0.05 mole) of ethyl acrylate and 1.8 g. (0.038 mole) of dry ethanol is added over a period of 45 minutes at 25–29° C. The resulting reaction mixture is stirred for 6 hours at room temperature during which the color changes from a yellow-grey to a deep yellow. The maximum temperature reacted during the reaction is 33° C. The reaction mixture is allowed to stand overnight under an atmosphere of nitrogen. Three milliliters of absolute ethanol are added to decompose any unreacted sodium hydride. The reaction mixture is washed with 50 ml. of water, 25 ml. of 1 N hydrochloric acid, three times with 25 ml. portions of dilute sodium bicarbonate solution, and 3 times with a saturated sodium chloride solution. The ethereal solution is dried, decolorized, and concentrated under reduced pressure to give a yellow oil. Vacuum distillation through a 4-inch Vigreux column gives 7.1 g. (48%) of diethyl 1-(p-chlorophenyl)-cis-1,2-cyclopropanedicarboxylate as a clear oil, boiling point 129–139° C./0.45 mm.

A solution of 4 g. (0.0135 mole) of diethyl 1-p-chlorophenyl-cis-1,2-cyclopropanedicarboxylate in 40 ml. of ethanol is treated with 13.5 ml. (0.0135 mole) of 1 N potassium hydroxide solution. The resulting solution is refluxed for 3 hours and then allowed to stand at room temperature overnight. The reaction solution is concentrated to the aqueous phase and extracted with ether to remove a small amount of mineral oil. The aqueous solution is treated with 13.5 ml. of 1 N hydrochloric acid whereupon an oil separates. The oily aqueous mixture is extracted three times with ether. The ethereal extracts are dried, decolorized, and concentrated under reduced pressure to give a yellow oil which crystallizes on cooling. Two recrystallizations from a mixture of ethyl acetate and petroleum ether (30–70° C.) give 1.6 g. (44.5%) of cis-2 - carbethoxy - 2 - p - chlorophenylcyclopropane-cis-carboxylic acid as a white crystalline solid, melting point 119–120.5° C.

A cooled solution of 0.85 g. (0.00316 mole) of cis-2-carbethoxy - 2-p-chlorophenylcyclopropane-cis-carboxylic acid in 20 ml. of methylene chloride is treated with 0.32 g. (0.00316 mole) of triethylamine and 0.378 g. (0.0035 mole) of ethyl chloroformate. The reaction solution is stirred at 0° for 1 hour and is then treated with 31 ml. of 15% diammonium phosphate solution. After stirring the reaction mixture for 3 hours at room temperature, the methylene chloride layer is separated and washed with water. The methylene chloride solution is dried and concentrated under reduced pressure to give an off-white solid. One recrystallization from methylene chloride and petroleum ether (30–70°) gives 0.8 g. (95%) of ethyl cis-2-carbamoyl - 1 - p-chlorophenylcyclopropane-cis-carboxylate as white crystals, melting point 143–155° C.

To a solution of 0.6 g. (0.0023 mole) of ethyl cis-2-carbamoyl-1-p-chlorophenylcyclopropane - cis-carboxylate in 65 ml. of dry absolute ethanol is added 10.5 ml. of a sodium ethoxide solution prepared by dissolving 500 mg. of sodium in 100 ml. of dry ethanol. The reaction is allowed to stand at room temperature for 2.5 hours and is then concentrated under reduced pressure to 10 ml. The solution is treated with 2.5 ml. of 1 N hydrochloric acid and the remaining ethanol is removed under reduced pressure to give a white solid. Two recrystallizations from aqueous ethanol give 0.40 g. (85%) of 1-(p-chlorophenyl)-1,2-cyclopropanedicarboximide as a white solid, melting point 141.5–143° C.

EXAMPLE II

The present compounds can be dispensed in dosage unit form such as hard shell capsules or soft shell capsules. A formulation found useful in the preparation of such capsules is as follows:

|  | Per 100 capsules, grams |
|---|---|
| 1-(1-p-chlorophenyl)-1,2-cyclopropanedicarboximide | 60.0 |
| Lactose, USP | 300.0 |
| Magnesium stearate (0.5%) | 3.125 |
| Total | 363.125 |

The above formulation is thoroughly mixed and placed as equal quantities in 100 capsules.

EXAMPLE III

The following example represents a formulation useful in preparing tablets or oblets. These tablets can be prepared with sufficient active ingredients for a one third day's use of about 700 mg. Larger tablets can be scored and divided into halves or quantities to be given one to four times a day. Obviously also smaller tablets can be used in multiple doses to obtain the daily amount of active material. The following formulation has been found useful.

|  | Per tablet, mg. |
|---|---|
| 1-(1-p-chlorophenyl)-1,2-cyclopropanedicarboximide | 700 |
| Corn starch | 210 |
| Methylcellulose 400 | 350 |
| Magnesium stearate 1% | 182 |
| Total | 1442 |

The above tablet contains 700 mg. of drug and would usually be given three to six times a day to obtain about the maximum amount of drug per day.

EXAMPLE IV

The compound of the present invention can also be given in the form of tablets containing other ingredients as follows:

|  | Per tablet, grams |
|---|---|
| 1-(p-chlorophenyl)-1,2-cyclopropanedicarboximide | 0.07 |
| Corn starch | 0.3 |
| Ethylcellulose N 10 | 0.005 |
| Magnesium stearate 1% | 0.0016 |
| Total | 0.3766 |

The above formulation can be varied by increasing or decreasing the corn starch and by the addition of other ingredients. Also, in place of corn starch other disintegrating agents such as potato starch, can be used. Other lubricants such as stearic acid, talc and the like can be used. Sweetening agents such as saccharin or sodium cyclohexyl sulfamate and flavoring such as peppermint oil, oil of wintergreen, orange or cherry can be used.

EXAMPLE V

The compounds of the present invention can be given intramuscularly in the following formulation:

| 1-(p-chlorophenyl)-1,2-chloropropanedicarboximide | mg./ml | 100 |
|---|---|---|
| Benzyl alcohol, percent |  | 0.9 |
| Cotton seed oil to make | ml | 1 |

EXAMPLE VI

The compounds of the present invention can be given intramuscular or subcutaneously in the following formulation:

| 1-(p-chlorophenyl)-1,2-cyclopropanedicarboximide | mg./ml | 200 |
|---|---|---|
| Sodium carboxymethylcellulose | mg | 10 |
| Sodium chloride | mg | 9 |
| Tween 80 | mg | 1 |
| Benzyl alcohol | mg | 9 |
| Sterile water to make | ml | 50 |

EXAMPLE VII

The compounds of the present invention can be given parenterally in the form of parenteral suspensions such as the following:

|  | Percent w./v., grams |
|---|---|
| 1-(p-chlorophenyl)-1,2-cyclopropanedicarboximide | 10–50 |
| Polysorbitan 80 | 0.1–0.2 |
| Polyethylene glycol 4000 | 2.0–5.0 |
| Sodium chloride USP | 0.5–0.8 |
| Benzyl alcohol | 0.9 |
| Pyrogen-free distilled water to make cc | 100.0 |

The above suspension has a pH of about 6. Obviously, other ingredients can be used in place of the above to prepare desired suspensions. For example, as surfactants in place of polysorbitan 80 we can use ethylene oxide of polyoxypropylene base and so forth. Other suspending agents such as carboxymethylcellulose, methyl cellulose and gelatin can be used. Other salts than sodium chloride can be used such as sodium phopshates. While benzyl alcohol is a desirable preservative, others can be used such as parabens, chlorobutanol etc. Also, in place of polyethylene glycol 4000 other vehicles can be used such as polyethylene glycol 400.

We claim:

1. A method of inducing relief of depression in warm-blooded animals which comprises administering to warm-blooded animals suffering from depression a composition having as the essential active ingredient 1- (p-chlorophenyl)-1,2-cyclopropanedicarboximide, said composition being in an amount to produce relief of depression.

2. A method of inducing relief of depression in warm-blooded animals which comprises administering to said animals suffering from depression a composition containing 1-(p-chlorophenyl)-1,2-cyclopropanedicarboximide in an amount of from 1 mg. to 100 mg. per kilogram of body weight per day, and a pharmaceutical carrier.

References Cited

UNITED STATES PATENTS 3,166,571  1/1965  Izzo et al. _____ 167—65

ALBERT T. MEYERS, *Primary Examiner.*

SAM ROSEN, *Examiner.*

S. J. FRIEDMAN, *Assistant Examiner.*